United States Patent
Barrus

(10) Patent No.: US 9,652,562 B2
(45) Date of Patent: May 16, 2017

(54) PROXIMAL EQUIPMENT DATA CAPTURE

(71) Applicant: John W. Barrus, Menlo Park, CA (US)

(72) Inventor: John W. Barrus, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 791 days.

(21) Appl. No.: 13/789,609

(22) Filed: Mar. 7, 2013

(65) Prior Publication Data

US 2014/0256261 A1  Sep. 11, 2014

(51) Int. Cl.
- *G06F 17/00* (2006.01)
- *G06F 17/40* (2006.01)
- *H04B 7/24* (2006.01)
- *G06F 17/24* (2006.01)
- *G06Q 10/06* (2012.01)

(52) U.S. Cl.
CPC ............ *G06F 17/40* (2013.01); *G06F 17/243* (2013.01); *G06Q 10/06* (2013.01); *H04B 7/24* (2013.01)

(58) Field of Classification Search
CPC .................................................. G06F 17/243
See application file for complete search history.

(56) References Cited

U.S. PATENT DOCUMENTS

| | | | |
|---|---|---|---|
| 5,563,999 A * | 10/1996 | Yaksich ................ | G06F 17/243 715/209 |
| 6,636,790 B1 | 10/2003 | Lightner | |
| 6,931,309 B2 | 8/2005 | Phelan et al. | |
| 8,000,532 B2 | 8/2011 | Van Hove et al. | |
| 2002/0004729 A1* | 1/2002 | Zak ........................ | G06F 19/322 705/3 |
| 2003/0062998 A1* | 4/2003 | Rubenstein ............ | G06Q 10/10 340/539.2 |
| 2006/0106804 A1* | 5/2006 | Chande ................ | G06F 17/2247 |
| 2006/0161646 A1* | 7/2006 | Chene ................... | G06F 17/243 709/223 |
| 2006/0247885 A1* | 11/2006 | Manfredi ............ | G06F 11/3672 702/120 |
| 2007/0271085 A1* | 11/2007 | Hamdi ..................... | G06F 8/51 703/27 |
| 2008/0040075 A1* | 2/2008 | Fillmann ............... | G06Q 10/10 702/187 |
| 2008/0091846 A1* | 4/2008 | Dang .................... | G06F 17/243 709/246 |
| 2008/0242220 A1* | 10/2008 | Wilson ................ | H04M 1/7253 455/3.04 |

(Continued)

OTHER PUBLICATIONS

Honeywell Scanning & Mobility, Dolphin 99EX, Mobile Computer, Oct. 2011, 2 pages.

*Primary Examiner* — Scott Baderman
*Assistant Examiner* — Benjamin J Smith
(74) *Attorney, Agent, or Firm* — Patent Law Works LLP

(57) ABSTRACT

A system and method for capturing logged data from proximal equipment onto a form. A form creation application determines equipment in proximity to a portable computing device, receives a selection of a piece of equipment from a user, extracts logged data from the piece of equipment that is selected, determines a form with a structure to fill in with the logged data, parses the logged data and fills in at least one field in the form, generates graphical data for displaying the form to the user, provides the form to the user, receives input on the form from the user and stores the form and the input received on the form.

14 Claims, 8 Drawing Sheets

(56) References Cited

U.S. PATENT DOCUMENTS

| | | | |
|---|---|---|---|
| 2008/0249791 A1* | 10/2008 | Iyer | G06Q 10/06 705/1.1 |
| 2009/0097077 A1* | 4/2009 | Swartz | H04N 1/00355 358/474 |
| 2009/0100326 A1* | 4/2009 | McCormick | G06Q 10/10 715/226 |
| 2010/0131447 A1* | 5/2010 | Creutz | G06F 17/276 706/52 |
| 2010/0180190 A1* | 7/2010 | Carroll | H04M 11/10 715/224 |
| 2010/0328225 A1* | 12/2010 | Black | G06Q 10/10 345/173 |
| 2010/0332363 A1* | 12/2010 | Duddle | B67D 7/348 705/34 |
| 2011/0144451 A1* | 6/2011 | Robertson | A61B 5/684 600/300 |
| 2011/0145739 A1* | 6/2011 | Berger | G06F 17/243 715/763 |
| 2012/0154141 A1* | 6/2012 | Piccolo, III | G08B 25/14 340/539.11 |
| 2013/0104064 A1* | 4/2013 | McCormick | G06F 3/0484 715/765 |
| 2013/0117652 A1* | 5/2013 | Folsom | G06F 17/243 715/222 |
| 2013/0139044 A1* | 5/2013 | Iversen | G06F 17/243 715/224 |
| 2014/0074655 A1* | 3/2014 | Lim | G06Q 20/32 705/26.35 |

* cited by examiner

400

401

02:15

Vehicle Usage Log

| Driver: | Date of Trip: |
|---|---|
| Vehicle Make: | Vehicle Model: |
| Vehicle License Plate: | Vehicle Home Base: |
| # People: | Destination: |
| Trip Start Time: | Trip End time: |
| Start Odometer: | End Odometer: |
| Maximum Speed: | Average Speed: ☐ |
| Current Mileage: | Mileage Difference: ☐ |
| Current Location: | Track Checkpoint: ☐ |
| Comments (Maintenance, Repair, Fuel, etc.): ||

Signature

Driver:_____

Inspector:_____

403

Scan

Collect Data

Erase Strokes

Calculate

Submit Form

Figure 4

Vehicle Usage Log

| | |
|---|---|
| Driver: 501 | Date of Trip: 7/1/2013 |
| Vehicle Make: UPJ | Vehicle Model: SX2012 |
| Vehicle License K9484L | Vehicle Home Base: LAX |
| # People: | Destination: 511 |
| Trip Start Time: 09:04:22 AM | Trip End Time: 03:35:45 PM |
| Start Odometer: 80085  515 | End Odometer: 503 80467  505 |
| Maximum Speed: 76 MPH | Average Speed: 59 MPH ■ |
| Current Mileage: 23 MPG | Mileage Difference: 4.2 MPG ■ |
| Current Location: San Francisco | Track Checkpoint: ☐ |
| Comments (Maintenance, Repair, Fuel, etc.): | |

Signature

Driver: _____

Inspector: _____

Scan

Collect Data       Erase Strokes

Calculate  507    Submit Form

| | 02:15 | |
|---|---|---|
| | Vehicle Usage Log 601 | |
| Driver: *Oscar Mike* | Date of Trip: | 7/1/2013 |
| Vehicle Make: UPJ | Vehicle Model: | SX2012 |
| Vehicle License K9484L | Vehicle Home Base: | LAX |
| # People: 2 | Destination: | SF |
| Trip Start Time: 09:04:22 AM | Trip End time: | 03:35:45 PM |
| Start Odometer: 80085 | End Odometer: | 80467 |
| Maximum Speed: 76 MPH | Average Speed: | 59 MPH ■ |
| Current Mileage: 23 MPG | Mileage Difference: | 4.2 MPG ■ |
| Current Location: San Francisco | Track Checkpoint: | ☐ |
| Comments (Maintenance, Repair, Fuel, etc.): *Check tire pressure, change oil.* 603 | | |

Signature

Driver: _~~~@_ 605

Inspector: _~~~_ 607

[ Scan ]

[ Collect Data ]          [ Erase Strokes ]

[ Calculate ]      609 [ Submit Form ]

Figure 6

PROXIMAL EQUIPMENT DATA CAPTURE

BACKGROUND OF THE INVENTION

1. Field of the Invention

The specification relates to a system and method for capturing logged data from proximal equipment. In particular, the specification relates to capturing logged data for insertion into a structured form.

2. Description of the Background Art

Many types of equipment are inspected periodically and information associated with the equipment is recorded on a paper document by hand during inspection. If the paper document includes incorrect information or if the information is filled in at a wrong field on the paper document, the processing of regular equipment logs becomes inefficient and slow. Some portable devices exist that receive inputs such as signatures; however, the portable devices fail to communicate with data logging equipment to fill in a document with the data. As a result, the technology has limited value for data analytics purposes.

SUMMARY OF THE INVENTION

The present disclosure overcomes the deficiencies of the prior art with a system and method for capturing logged data from proximal equipment onto a form. In one embodiment, the system includes a form creation application. The form creation application is configured to determine equipment in proximity to a portable computing device, to receive a selection of a piece of equipment from a user, to extract logged data from the piece of equipment that is selected, to determine a form with a structure to fill in with the logged data, to parse the logged data and fill in at least one field in the form, to generate graphical data for displaying the form to the user, to provide the form to the user, to receive stroke input on the form from the user and to store the form and the stroke input received on the form.

Other aspects include corresponding methods, systems, apparatuses, and computer program products for these and other innovative aspects.

This results in a faster and more efficient method of processing equipment logs. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

FIG. 4 is a graphic representation of an embodiment of a user interface that identifies a blank form for filling the logged data extracted from proximal equipment.

FIG. 5 is a graphic representation of an embodiment of a user interface that displays symbolic information parsed from the logged data inserted into the fields of the blank form.

FIG. 6 is a graphic representation of an embodiment of a user interface that displays handwriting strokes on the form that includes the symbolic information parsed from the logged data.

DETAILED DESCRIPTION OF THE PREFERRED EMBODIMENTS

Figure 1:
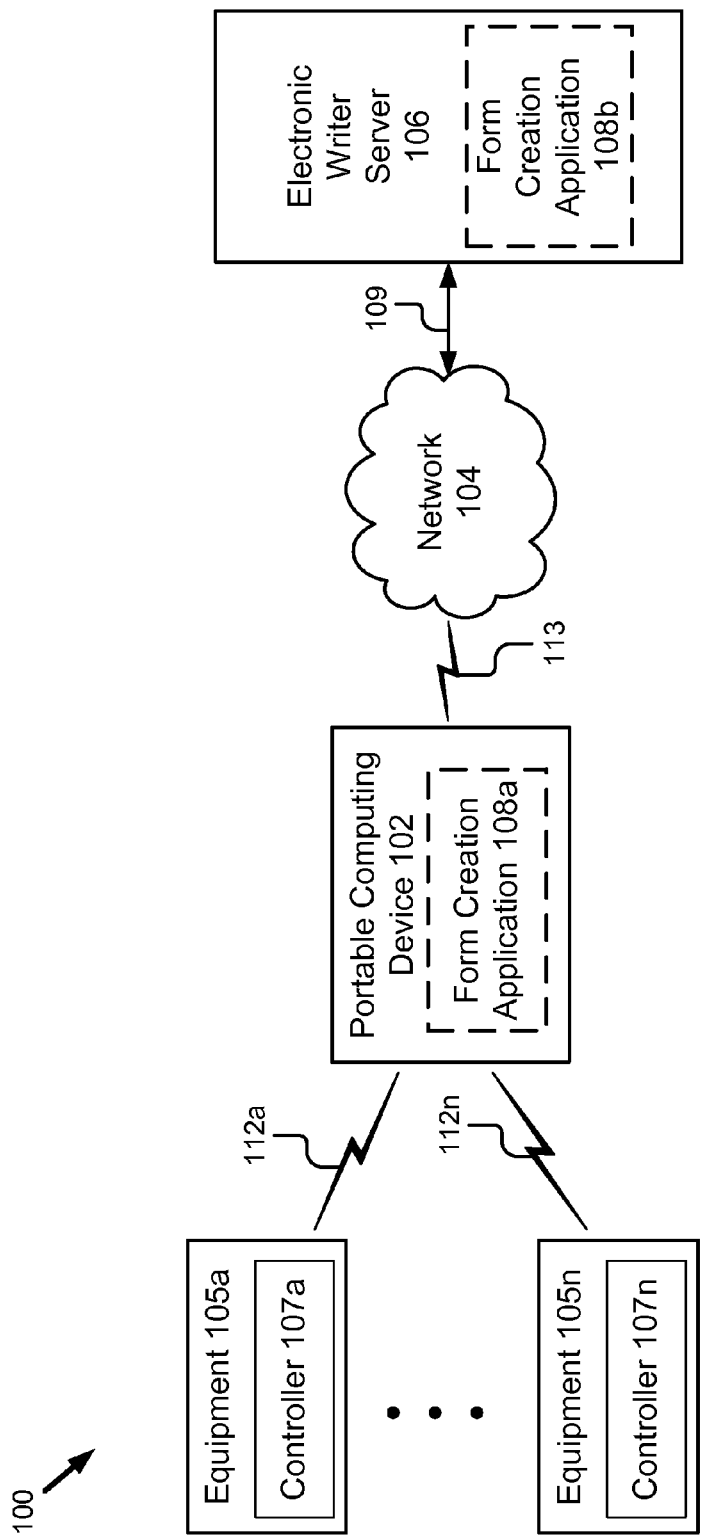
FIG. 1 is a high-level block diagram illustrating one embodiment of a system for capturing logged data from proximal equipment onto a form.

A system and method for capturing logged data from proximal equipment onto a form is described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for capturing logged data from proximal equipment onto a form. The illustrated embodiment of the system 100 comprises: a portable computing device 102, equipment 105a-105n, and an electronic writer server 106 that are each communicatively coupled to the network 104. In FIG. 1 and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multi-media messaging service (MMS), hypertext transfer protocol (HTTP), direct data connection, wireless access point (WAP), email, etc. While only one network 104 is coupled to the portable computing device 102, the equipment 105a-105n and the electronic writer server 106, in practice any number of networks 104 can be connected to the entities.

The equipment 105a-105n is each wirelessly coupled to the portable computing device 102 and the network 104 via the signal lines 112a-112n respectively. The equipment 105 is any instrument, machinery or apparatus designed for a specific operation and needing regular inspection. For example, the equipment 105 includes a car, a truck, a poultry feeding station, a manufacturing machinery, a patient monitor, etc. Each piece of equipment 105 includes a controller 107. In one embodiment, the controller 107 is a data logger that includes a processor, a memory and a sensor for recording data over time (e.g., a 12 or 24-hour timeframe) or in relation to the environmental conditions. For example, the data recorded by the controller 107 includes temperature, pressure, weight, humidity, power, speed, mileage, gas level, water level, location, time of operation, etc. The controller 107 in the equipment 105 is adapted to send and receive data to and from the portable computing device 102. In one embodiment, the controller 107 uses a serial communication protocol (e.g., controller area network (CAN) bus, Bluetooth Serial Port Protocol, etc.) that allows the portable computing device 102 to connect to the controller 107 and extract logged data. For example, the portable computing device 102 sends a request to access data recorded by the controller 107 in a car. The car includes a standard ODB (On-Board Diagnostics) port (e.g. the ODB-II port) supporting a serial Bluetooth connection and the controller 107 provides the recorded data to the portable computing device 102 through the serial Bluetooth connection (e.g. the Soliport ELM 327 Bluetooth OBDII OBD2 diagnostic scanner). The controller 107 in the equipment 105 is accessed by users that have permission to access information, such as a plant operator, vehicle driver, machinery inspector, doctor, etc.

The portable computing device 102 is wirelessly coupled to the network 104 via signal line 113. The portable computing device 102 is any computing device including a memory, a processor and wireless communication capability. For example, the portable computing device 102 can be a tablet computer, a personal digital assistant, a smart phone, etc. The portable computing device 102 is adapted to identify forms, add stroke annotations to the forms and send the annotated forms to the electronic writer server 106. A form is any document that includes fields (i.e., blank spaces) for insertion of requested information. The form when filled out with the requested information may be a statement, an order, a request, a report, etc. For example, a form can be a tax form, an insurance form, an inspection form, a medical form, a maintenance log, a vehicle usage log, an electronic check, a job application, a survey, a receipt, etc. Although only one portable computing device 102 is illustrated, multiple portable computing devices 102 can be used. For example, multiple doctors and nurses can each use a portable computing device 102 in a hospital to access the same equipment 105.

In one embodiment, the portable computing device 102 is a tablet computer including a computing pad and a stylus. The computing pad is adapted to display a form and capture any strokes written on the form using the stylus or the user's fingertip. The strokes are typically displayed on top of the form, just as if written by pen on paper. The computing pad usually captures the strokes as a sequence of points or segments along with location, timing and pressure information. The computing pad sends the form data including the captured strokes in any image format known to persons of ordinary skill in the art, for example, scalable vector graphics (SVG) file format. In one embodiment, the computing pad attaches the information associated with the strokes, for example, the location, the pressure profiles and timing information with the form data as metadata. In one embodiment, the captured strokes are saved in a stroke format known to any person of ordinary skill in the art, including Scalable Vector Graphics (SVG) or Ink Markup Language (InkML). The portable computing device 102 determines location information by using global positioning system (GPS) circuitry included within the device itself to determine its location. In one embodiment, the portable computing device 102 accesses a database including pairs of media access control (MAC) addresses of local wireless access points. To determine a location, the portable computing device 102 only retrieves the location corresponding to the access point MAC address from the database. For determining the portable computing device's 102 location indoors, the portable computing device 102 employs radio frequency, ultra-sound signal or invisible light communication. For example, the portable computing device 102 determines its location through wireless access points based on measuring the intensity of received signals. In one embodiment, the portable computing device 102 determines its location based on the nearby equipment 105 where a database of the location of each piece of equipment 105 is updated and accessible to the portable computing device 102. In one embodiment the portable computing device determines its location based on the location give by equipment 105 which may also contain hardware for determining its location including a GPS sensor.

In one embodiment, a form creation application 108a is operable on the portable computing device 102. The form creation application 108a receives information from the controllers 107a-107n in the equipment 105a-105n and generates a form. For example, a doctor collects patient information during morning rounds and the form creation application 108a generates a summary of patient information.

The electronic writer server 106 is any computing device including a memory and a processor which is coupled to the network 104 via signal line 109. In one embodiment, the electronic writer server 106 includes a form creation application 108b. The form creation application 108b generates one or more types of forms for a user to complete. For example, the form creation application 108b generates forms relating to vehicle usage logs, machine logs, patient health checkup forms, etc. The form creation application 108b specifies the coordinates of form fields, labels of individual fields and labels of groups of fields in the form. In one embodiment, the form creation application 108b receives forms that are filled out with handwriting strokes and inserted with logged data extracted from one or more pieces of equipment 105 through the portable computing device 102. The electronic writer server 106 collects the forms, handwriting strokes and logged data inserted into the fields of the forms for storage.

The form creation application 108 is described in further detail below with reference to FIG. 2. In one embodiment, the form creation application 108 determines one or more items of equipment 105 in proximity to a portable computing device 102, receives a selection of an item of equipment 105 from a user, extracts logged data from the item of equipment 105 that is selected, determines a form with a structure to fill in with the logged data, parses the logged data and fills in at least one field in the form, generates graphical data for displaying the form to the user, receives stroke annotations on the form from the user and stores the form and the stroke annotations received on the form in the data storage.

Form Creation Application 108

Figure 2:
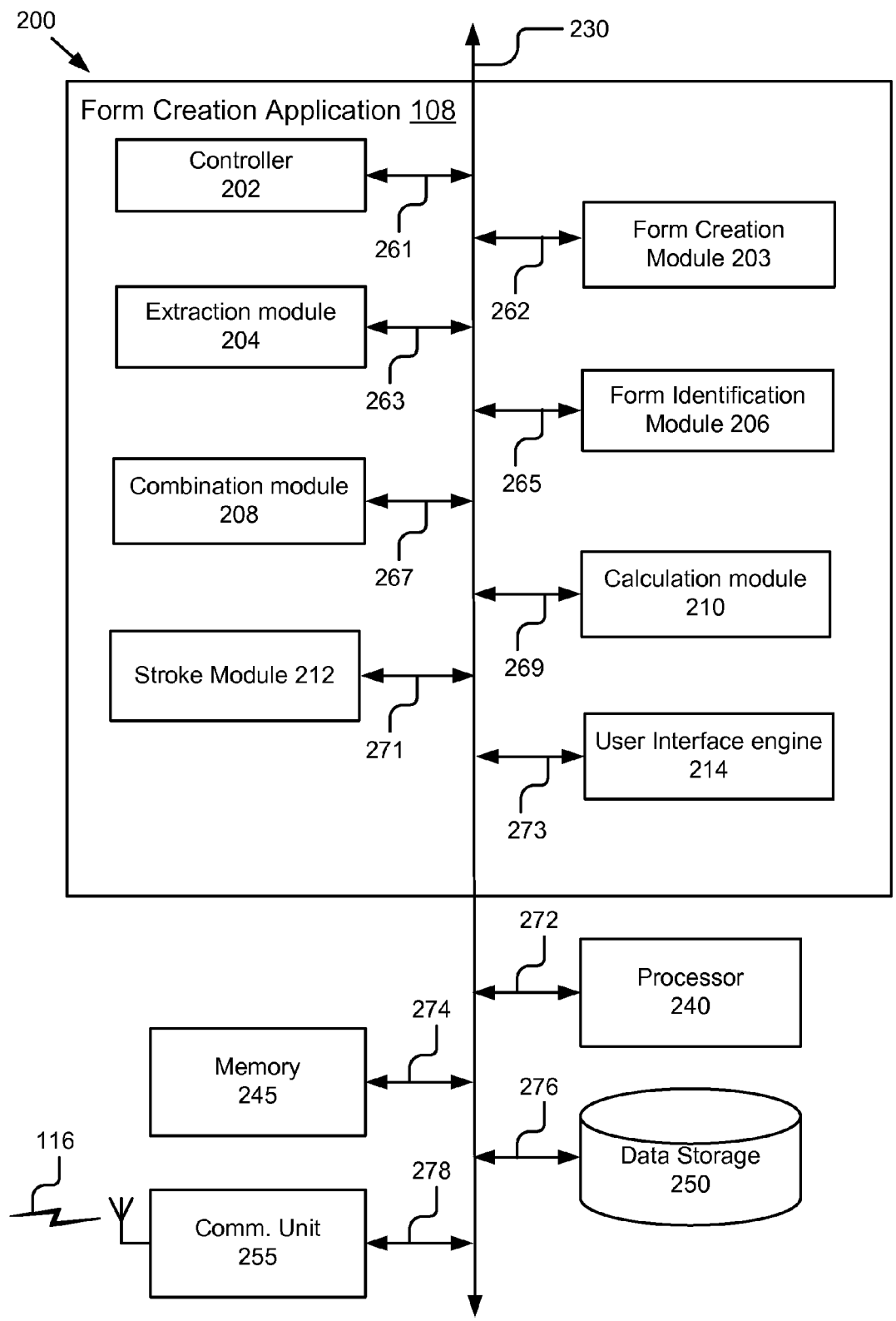
FIG. 2 is a block diagram illustrating one embodiment of a form creation application in more detail.

Referring now to FIG. 2, the form creation application 108 is shown in more detail. FIG. 2 is a block diagram of a computing device 200 that includes a processor 240, a memory 245, a communication unit 255, data storage 250 and the form creation application 108. In one embodiment, the computing device 200 is the electronic writer server 106. In another embodiment, the computing device 200 is the portable computing device 102.

The processor 240, the memory 245, the communication unit 250 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 230 for communication with the other components of the computing device 200 via signal line 272. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components of the computing device 200 via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the portable computing device 102 and transmits the requests to the extraction module 204, for example a request for extracting logged data. The communication unit 255 also receives information, such as form data, from the electronic writer server 106. The communication unit 255 transmits information including form data to the portable computing device 102 for display, for example, in response to a request. The communication unit 255 is coupled to the bus 230 via signal line 278. In one embodiment, the communication unit 255 includes a port for direct physical connection to the portable computing device 102 or to another communication channel. For example, the communication unit 255 includes an RJ45 port or similar port for wired communication. In another embodiment, the communication unit 255 includes a wireless transceiver for exchanging data with the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of forms received from the electronic writer server 106. The data storage 250 is coupled to the bus 230 for communication with the other components via signal line 276. In one embodiment, the data storage 250 receives information from the electronic writer server 106 to store a blank form and metadata describing the identity and the location of fields, labels, images and/or symbolic text for labels on the blank form that corresponds to a completed form. The data storage 250 stores a form identifier associated with the forms. In one embodiment, the data storage 250 receives logged data extracted from proximal equipment by the extraction module 204. In another embodiment, the data storage 250 receives a completed form filled with symbolic information parsed from the logged data from the combination module 208. In one embodiment, the data storage 250 stores the handwriting stroke data as metadata of the completed form in compressed format, such as, Ink Markup Language (InkML), Scalable Vector Graphics (SVG), etc. received from the stroke module 212. The stroke metadata also includes stroke information including a date and time that each stroke was input and the location of each stroke.

In one embodiment, the form creation application 108 comprises a controller 202, a form creation module 203, an extraction module 204, a form identification module 206, a combination module 208, a calculation module 210, a stroke module 212 and a user interface engine 214.

The controller 202 is software and routines for receiving data via the communication unit 255, routing the data to the appropriate engine or module and transmitting responses from modules or engines to the communication unit 255 for transmitting to the portable computing device 102 and other components of the system 100. In one embodiment, the controller 202 is a set of instructions executable by the processor 240 to provide the functionality described below for managing data transfer between the components of the electronic writer server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255, the form creation module 203, the extraction module 204, a form identification module 206, the combination module 208, the stroke module 212, the calculation module 210, the user interface engine 214 and other components of the computing device 200 via signal line 261.

The form creation module 203 is software and routines for creating forms. In one embodiment, the form creation module 203 is a set of instructions executable by the processor 240 to provide the functionality described below for creating forms or identifying fields in pre-existing forms. In another embodiment, the form creation module 203 is stored in the memory 245 and is accessible and executable by the processor 240. In either embodiment, the form creation module 203 is adapted for cooperation and communication with the processor 240, the communication unit 255, other components of the computing device 200 via signal line 262.

In one embodiment, the form creation module 203 generates the forms that the logged data is input into and the forms that summarize the logged data. The form creation module 203 generates fields and a field identifier for each field. The fields include, for example, name of equipment, year created, mileage, patient name, etc. The form creation module 203 generates labels for the fields that are used when summarizing the logged data in the completed forms. The form creation module 203 assigns form identifiers to the forms. The form creation module 203 provides the blank form and metadata describing the identity and the location of fields, labels, images and/or symbolic text for labels on the blank form to the portable computing device 102.

The extraction module 204 is software and routines for interfacing with proximal equipment for retrieving logged data. In one embodiment, the extraction module 204 is a set of instructions executable by the processor 240 to provide the functionality described below for interfacing with pieces of equipment in proximity. In another embodiment, the extraction module 204 is stored in the memory 245 and is accessible and executable by the processor 240. In either embodiment, the extraction module 204 is adapted for cooperation and communication with the controller 202, the form creation module 203, the form identification module 206, the combination module 208, the calculation module 210, the user interface engine 214, the data storage 250 and other components of the computing device 200 via signal line 263.

In one embodiment, the extraction module 204 determines one or more pieces of equipment in proximity of the portable computing device 102. For example, one or more pieces of equipment include poultry feeding stations in a poultry farm, rental cars in a parking lot, semi-trucks at a warehouse lot, patient monitors in a hospital ward, etc. In one embodiment, the extraction module 204 measures the intensity of received signals from the one or more pieces of equipment at the location of the portable computing device 102. The extraction module 204 determines a list of available pieces of equipment 105 for the portable computing device 102 and instructs the user interface engine 214 to generate graphical data for displaying a list of the equipment 105, for example, in decreasing order of the signal strength received from the pieces of equipment at the location of the portable computing device 102. For example, the extraction module 204 determines a list of rental cars based on the signal strength of wireless transmitters connected to the Engine Control Unit (ECU) of the rental cars in a parking lot within a radius of 50 meters of the portable computing device 102. In one embodiment the extraction module 204 determines a list of rental cars based on what signals are available or visible to the portable computing device 102.

In one embodiment, the extraction module 204 receives a selection from a user of a piece of equipment 105 from the one or more pieces of equipment in the list. In another embodiment, the extraction module 204 automatically selects a piece of equipment 105 with the highest signal strength. In another embodiment, the extraction module 204 determines a piece of equipment 105 with a higher signal strength measured at the location of the portable computing device 102. For example, a first poultry feeding station in a row of feeding stations is closer to an inspection tablet computer having a higher radio strength compared to other feeding stations and the extraction module 204 selects the closest poultry feeding station for the inspection tablet computer.

In one embodiment, the extraction module 204 extracts logged data from the selected piece of equipment through a serial wireless communication channel (e.g., Bluetooth Serial Port Protocol). In one example, the extraction module 204 extracts from a controller 107, for example a data logger, connected to a poultry feeding station logged data including what type of feed was given, how much feed was used and at what time was the feed given. In a second example, the extraction module 204 extracts from a controller 107, for example an Engine Control Unit (ECU) of a car, logged data including fuel efficiency, fuel tank level, average speed, current location, gas mileage, diagnostic trouble codes, etc. In a third example, the extraction module 204 extracts from a controller 107 connected to machinery in a manufacturing plant logged data including how much power the machinery is consuming, how long the machinery has been in operation and how many defects were found in the items manufactured by the machinery. In a last example, the extraction module 204 extracts from a controller 107, for example an electronic patient monitor, logged data including an electrocardiogram, blood pressure rates, oxygen saturation levels, temperature, etc. measured for a patient. In one embodiment, the extraction module 204 stores the logged data extracted from pieces of equipment in the data storage 250.

The form identification module 206 is software and routines for identifying a form with structure for inserting the logged data extracted from the equipment. In one embodiment, the form identification module 206 is a set of instructions executable by the processor 240 to provide the functionality described below for identifying a structured form in which to insert the logged data. In another embodiment, the form identification module 206 is stored in the memory 245 and is accessible and executable by the processor 240. In either embodiment, the form identification module 206 is adapted for cooperation and communication with the controller 202, the form creation module 203, the extraction module 204, the combination module 208, the data storage 250 and other components of the computing device 200 via signal line 265.

In one embodiment, the form identification module 206 determines a form to insert the logged data into based on the location of the portable computing device 102. In one embodiment, the form identification module 206 determines the location of the portable computing device 102, the location of the equipment 105, and responsive to determining the locations retrieves a form from the data storage 250 that is available for those locations. For example, the form identification module 206 determines that the portable computing device 102 is at the location of a poultry farm and retrieves a form associated with keeping a log on poultry feeding stations for the portable computing device 102.

In another embodiment, the form identification module 206 determines a form to insert the logged data into based on the type of equipment 105 that transmits the logged data. For example, each piece of equipment 105 could indicate what type of device it is using Device Identification of the Service Discovery Protocol (SDP) over a Bluetooth connection. The form identification module 206 determines the type of equipment 105 that is available for communication and retrieves a form from the data storage 250 based on the type of equipment 105. For example, the form identification module 206 determines that the equipment ready to connect is a patient monitor and retrieves a "Patient Checkup" form for the portable computing device 102. In one embodiment, the form identification module 206 transmits the form to the combination module 208 to insert the logged data extracted from equipment which is described in more detail below. In one embodiment, the user of the portable computing device 102 identifies a form as a container to hold the logged data.

The combination module 208 is software and routines for parsing the logged data and inserting the parsed data into the form. In one embodiment, the combination module 208 is a set of instructions executable by the processor 240 to provide the functionality described below for parsing the logged data and inserting the parsed data into one or more fields in the form. In another embodiment, the combination module 208 is stored in the memory 245 and is accessible and executable by the processor 240. In either embodiment, the combination module 208 is adapted for cooperation and communication with the controller 202, the form identification module 206, the stroke module 212, the data storage 250 and other components of the computing device 200 via signal line 267.

In one embodiment, the combination module 208 receives the form from the form identification module 206 for inserting the logged data extracted from equipment into the form. The combination module 208 parses the logged data received from the extraction module 204. In another embodiment, the combination module 208 retrieves the logged data from the data storage 250. The parsed data is inserted into one or more fields on the form based on matching the field labels identified in the form with the type of parsed data. For example, the combination module 208 associates a first logged odometer read with a field label "Start Odometer" in a "Vehicle Usage Log" form and inserts the parsed data into the field associated with the field label "Start Odometer". In another example, the combination module 208 associates an electrocardiogram reading with a field label "ECG" in a patient "Health Checkup" form. In another embodiment, the combination module 208 parses the logged data (if logged data is recorded in the equipment in a reading order of the form) by inserting the first item of parsed data into a first field of the form, a second item of parsed data into a second field and so on. In one embodiment, the combination module 208 highlights fields that are empty and do not match the parsed data. For example, in a "Vehicle Usage Log", a signature field of the driver does not match the parsed data and is highlighted with a color for visibility. In one embodiment, the combination module 208 instructs the user interface engine 214 to generate graphical data to display the form filled with parsed data for a display with resolution higher than Video Graphics Array (VGA). The form filled with the parsed data can be displayed in its entirety on a display with higher resolution than VGA 640 pixels by 480 pixels.

The calculation module 210 is software and routines for performing calculations based on the logged data received from equipment. In one embodiment, the calculation module 210 is a set of instructions executable by the processor 240 to provide the functionality described below for performing calculations on the logged data. In another embodiment, the calculation module 210 is stored in the memory 245 and is accessible and executable by the processor 240. In either embodiment, the calculation module 210 is adapted for cooperation and communication with the processor 240, the combination module 208, the stroke module 212, the user interface engine 214, the data storage 250 and other components of the computing device 200 via signal line 269.

In one embodiment, the calculation module 210 receives the logged data from the extraction module 204 or retrieves the logged data from the data storage 250. The calculation module 210 performs a calculation based on the logged data and inserts the calculation into one or more fields on the form. The form includes the symbolic information parsed from the logged data and inserted into the form by the combination module 208. In one example, the calculation module 210 receives from of the controller 107 in a rental car logged data including current mileage on a most recent trip. The calculation module 210 compares the current mileage with the last logged mileage for the rental car on a previous trip and calculates a mileage difference. The calculation module 210 inserts the calculated mileage difference into a field "Mileage Difference" in the "Vehicle Usage Log" form. In another example, the calculation module 210 receives logged data from the ECU including "Trip Start Time", "Trip End Time", "Start Odometer" and "End Odometer" and calculates average speed of the rental car. The calculation module 210 inserts the calculated average speed into a field "Average Speed" in the "Vehicle Usage Log" form. In the embodiment where the calculation module 210 is operating in the electronic writer server 106, the calculation module 210 performs the calculation by receiving the logged data from the portable computing device 102 and the returning the calculated data to be synchronized with the form in the portable computing device 102.

The stroke module 212 is software and routines for receiving stroke data from a user of the portable computing device 102 and rendering the stroke data on the form. In one embodiment, the stroke module 212 is a set of instructions executable by the processor 240 to provide the functionality described below for receiving and rendering the stroke data on the form. In another embodiment, the stroke module 212 is stored in the memory 245 and is accessible and executable by the processor 240. In either embodiment, the stroke module 212 is adapted for cooperation and communication with the processor 240, the combination module 208, the calculation module 210, the user interface engine 214, the data storage 250 and other components of the computing device 200 via signal line 271.

In one embodiment, the stroke module 212 receives the form from the combination module 208 or the calculation module 210. The stroke data is a list of x-y locations where the stylus, pen or other pointing device, like a finger, was sensed and the time of contact. In addition to the x-y locations, the stroke module 212 captures the time of each stroke or each point, the pressure of the stylus, which stylus was used or which end of a stylus was used. The stroke module 212 converts the stroke data into a vector description ordered by the time of writing including color, width and pressure information. The stroke module 212 stores the vector description of the strokes in the data storage 250. In one embodiment, the stroke module 212 saves the captured strokes using a well known stroke format including Scalable Vector Graphics (SVG) or Ink Markup Language (InkML). For example, a user includes a note on a "Vehicle Usage Log" form the mileage of the vehicle that the user recorded, such as, a substantial mileage drop from the last trip. In another example, the user signs the "Vehicle Usage Log" form to approve his inspection of the vehicle.

In one embodiment, the stroke module 212 renders the strokes onto the form by converting the vector description into line data, filled with pixels based on the color, width and pressure information and stores the form and the rendered strokes as metadata of the form in the data storage 250. The stroke module 212 renders the strokes using standard algorithms for rendering lines. In one embodiment, the stroke module 212 transmits the rasterized data to the user interface engine 214 and instructs the user interface engine 214 to display the form filled with the parsed data and the strokes.

In one embodiment, the stroke module 212 converts the stroke data to symbolic representations. For example, the stroke module 212 performs optical character recognition (OCR), Optical Mark Recognition (OMR), intelligent character recognition (ICR), handwriting recognition, pattern recognition, or any other technique known to those of ordinary skill in the art to convert the stroke data to symbolic representations.

The user interface engine 214 is software including routines for generating graphical data for displaying a user interface that includes the form where the logged data is parsed into fields on the form. In one embodiment, the user interface engine 214 is a set of instructions executable by the processor 240 to generate the user interface. In another embodiment, the user interface engine 214 is stored in the memory 245 and is accessible and executable by the processor 240. In either embodiment, the user interface engine 214 is adapted for cooperation and communication with the processor 240 and other components of the computing device 200 via signal line 273.

In one embodiment, responsive to a user of a portable computing device 102 requesting to extract logged data from a piece of equipment, the user interface engine 214 generates graphical data for displaying a form into which the logged data from the piece of equipment can be inserted. In another embodiment, the user interface engine 214 retrieves the form from the combination module 208 or from the data storage 250 and generates graphical data for displaying the form with parsed data inserted into the fields of the form. For example, the graphical data could include HyperText Markup Language (HTML) and Cascading Style Sheets (CSS) descriptions for portable computing device 102 to render the form. The user interface engine 214 generates graphical data to display the form filled with parsed data for a display with resolution higher than Video Graphics Array (VGA). In one embodiment, the user interface engine 214 receives instructions from the stroke module 212 to render strokes on the form filled with the logged data based on the vector description.

Example User Interfaces

Figure 3:
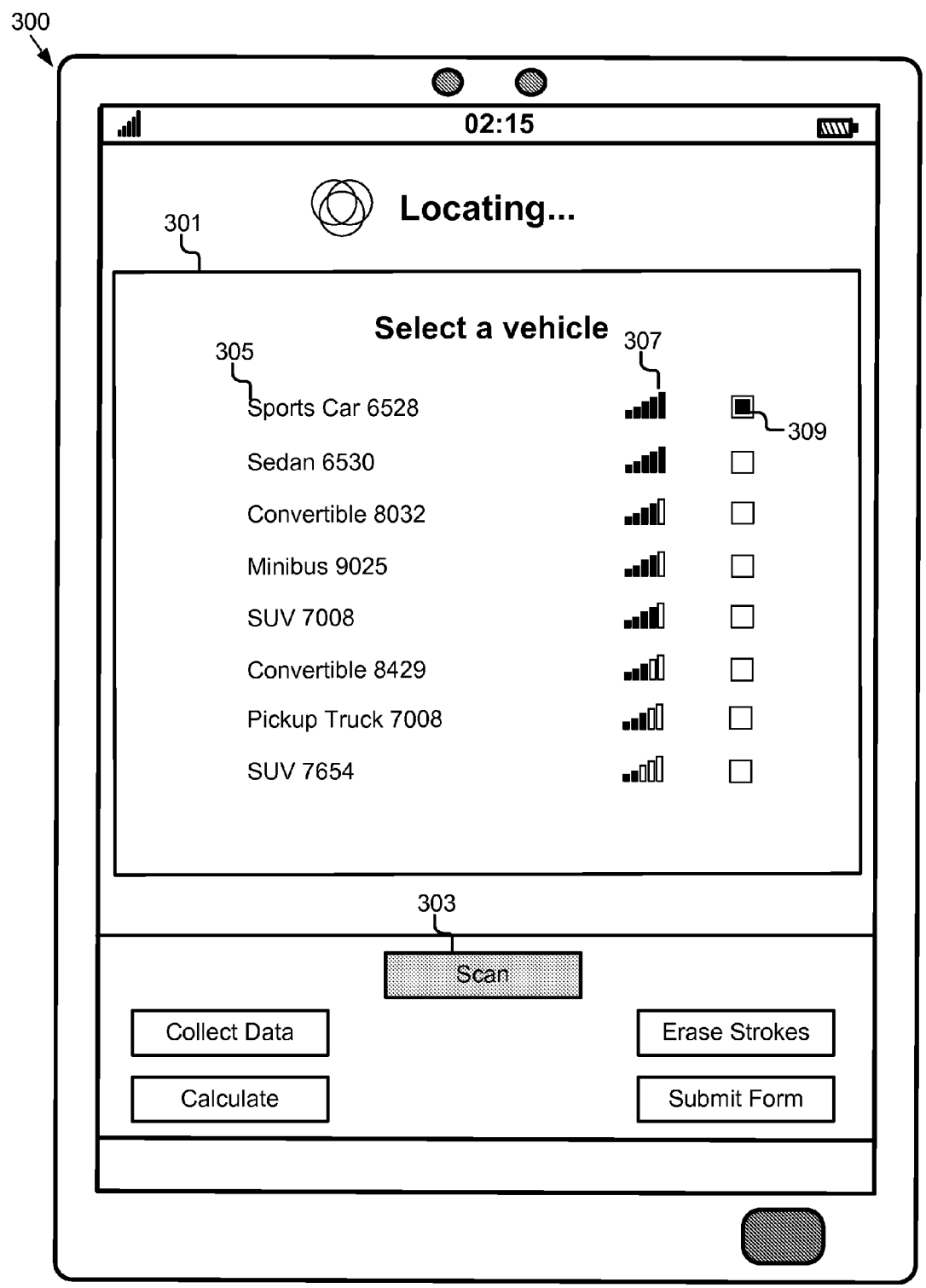
FIG. 3 is a graphic representation of an embodiment of a user interface that displays a list of available items of equipment in proximity to a portable computing device.

Turning now to FIG. 3, a graphic representation of an embodiment of a user interface 300 is illustrated that displays a list of available pieces of equipment in proximity of a portable computing device 102. In this graphic representation, if a user clicks the "Scan" button 303, the extraction module 204 detects the available vehicles and instructs the user interface 300 to generate graphical data for displaying a list 301 of the available vehicles. The list 301 includes a vehicle name 305, a signal strength 307 measured for a wireless transmitter connected to a controller 107 of the vehicle at the location of the portable computing device 102, and a checkbox 309 to select the vehicle for extracting logged data from the controller 107 of the vehicle. Upon checking the checkbox 309 for the vehicle 305 the user is directed to another user interface that displays a form identified for inserting the logged data from the vehicle 305.

FIG. 4 is a graphic representation of an embodiment of a user interface 400 that identifies a blank form for filling with the logged data extracted from the equipment 105. In this graphic representation, the user interface 400 includes a "Vehicle Usage Log" form 401 that is identified for inserting the logged data extracted from the vehicle 305 in FIG. 3. The form 401 is blank and upon the user clicking on the button "Collect Data" 403 the user is directed to another user interface that extracts and inserts the logged data into the fields of the form 401. In another embodiment, where there is only one form available that is associated with the equipment 105 or where the user selected the form, the form identification module 206 does not have to select a form. Instead, the form identification module 206 transmits the form to the combination module 208, which parses data without a step for providing the blank form to the user.

FIG. 5 is a graphic representation of an embodiment of a user interface 500 that displays symbolic information parsed from the logged data, which is inserted into the fields of the blank form. In this graphic representation, the user interface 500 includes the form 401 filled with symbolic information parsed from the logged data responsive to the user clicking on the button "Collect Data" 403 in FIG. 4. The make "UPJ" 501 of the vehicle is inserted into the field "Vehicle Make" in the form 401. In one embodiment, the user clicks a checkbox 505 in the form and the button "Calculate" 507 on the form 401 and the calculation module 210 calculates the average speed as "59 MPH". The average speed "59 MPH" 503 is calculated based on the parsed data inserted into "Trip Start Time" 509, Trip End Time" 511, "Start Odometer" 513 and "End Odometer" 515. In another embodiment (not shown), the calculation module 210 automatically calculates amounts in the form without the user selecting a button to make the calculation.

FIG. 6 is a graphic representation of an embodiment of a user interface 600 that displays adding handwriting strokes on the form that includes the symbolic information parsed from the logged data. In this graphic representation of the user interface 600, the user adds a name "Oscar Mike" 601 in handwriting using a stylus in the "Driver" field. The graphic representation includes the user annotating the form with a comment 603 under the "Comments" field. Additionally, the graphic representation records the handwritten signatures of the driver and the inspector in the fields 605 and 607 respectively. The user can submit the form populated with symbolic information from the logged data and handwriting strokes for storage by clicking on the button "Submit Form" 609.

Methods

Figure 7:
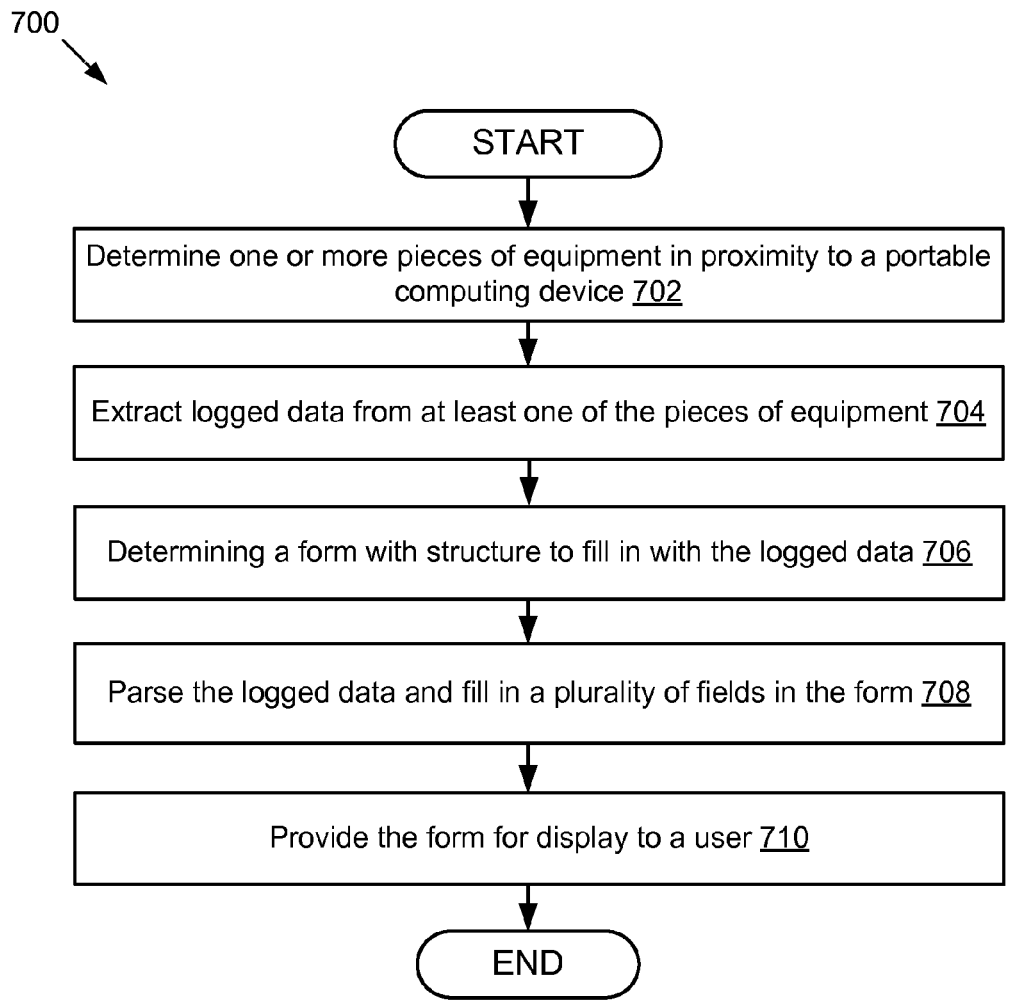
FIG. 7 is a flow diagram of one embodiment of a method for capturing logged data from proximal equipment onto a form.
Figure 8:
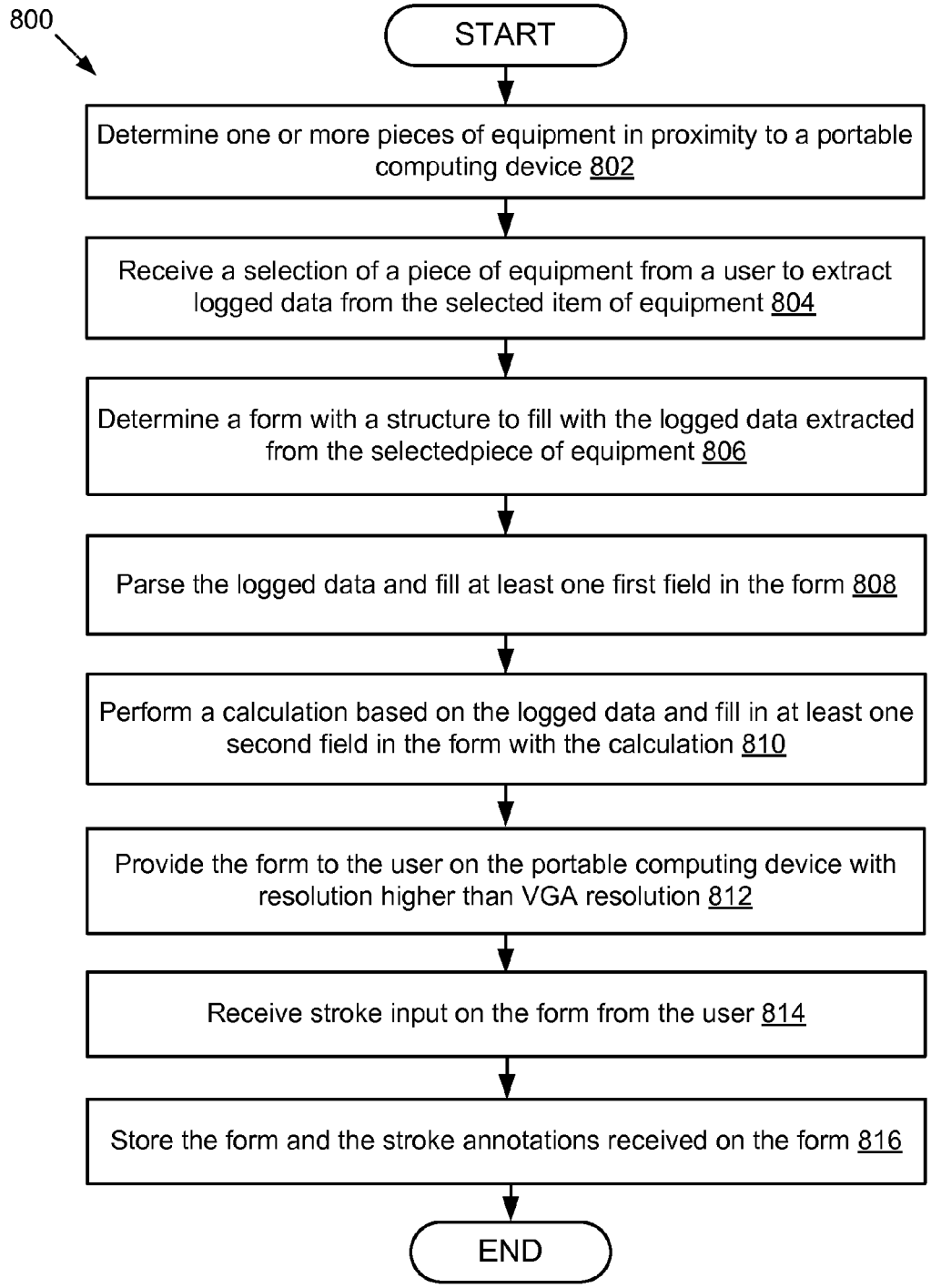
FIG. 8 is a flow diagram of another embodiment of a method for capturing logged data from proximal equipment onto a form.

Referring now to FIGS. 7 and 8, various embodiments of the methods of the invention will be described. FIG. 7 is a flow diagram 700 of an embodiment of a method for capturing logged data from proximal equipment 105 onto a form. The form creation application 108 includes an extraction module 204, a form identification module 206, a combination module 208, a stroke module 212 and a user interface engine 214. The extraction module 204 determines 702 one or more pieces of equipment in proximity to a portable computing device and extracts 704 logged data at least one of the pieces of equipment 105. For example, the extraction module 204 extracts from a data logger connected to a poultry feeding station logged data including what type of feed was given, how much feed was used and at what time was the feed given. The form identification module 206 determines 706 a form with structure to fill in with the logged data. For example, the form identification module 206 provides the user with a list of forms and the user selects one of the forms. In one example, the form identification module 206 determines that the location of the portable computing device 102 is at the location of a poultry farm and retrieves a form associated with keeping a log on poultry feeding stations for the portable computing device 102.

The combination module 208 parses 708 the logged data and fills in a plurality of fields in the form. For example, the combination module 208 associates a first logged odometer read retrieved from an ECU of a car with a field label "Start Odometer" in a "Vehicle Usage Log" form and inserts the symbolic data into the field associated with the field label "Start Odometer". The user interface engine 214 generates graphical data for displaying the form and provides 710 the form for display to the user.

In one embodiment, the stroke module 212 receives strokes on the form from the user and stores the form and the strokes received on the form. For example, a poultry farm inspector inputs a handwritten signature on the form associated with maintaining a log on poultry feeding stations to approve his inspection and the stroke module 212 stores the form and the strokes in the data storage 250.

FIG. 8 is a flow diagram 800 of another embodiment of a method for capturing logged data from proximal equipment onto a form. The form creation application 108 includes an extraction module 204, a form identification module 206, a combination module 208, a calculation module 210, a stroke module 212 and a user interface engine 214. In one embodiment, the extraction module 204 determines 802 one or more pieces of equipment 105 in proximity to a portable computing device 102 and receives 804 a selection of a piece of equipment 105 from a user to extract logged data from the selected piece of equipment. For example, a first poultry feeding station in a row of feeding stations is closer to an inspection tablet having a higher radio strength compared to other feeding stations and the user selects the first poultry feeding station. The form identification module 206 determines 806 a form with a structure to fill with the logged data extracted from the selected piece of equipment 105. For example, the form identification module 206 determines the location of the portable computing device 102 is at the location of a poultry farm or determines the identity of the equipment 105 connected to the portable computing device 102 as a poultry feeding station and retrieves a form associated with keeping a log on poultry feeding stations for the portable computing device 102. The combination module 208 parses 808 the logged data and fill at least one first field in the form. For example, the combination module 208 associates an electrocardiogram reading with a field label "ECG" in a patient "Health Checkup" form. The calculation module 210 performs 810 a calculation based on the logged data and fills in at least one second field in the form with the calculation. For example, the calculation module 210 receives from an ECU of a rental car logged data including the current mileage on a latest trip. The calculation module 210 compares the current mileage with the last logged mileage for the rental car on a previous trip and calculates a mileage difference. The calculation module 210 inserts the calculated mileage difference into a field "Mileage Difference" in the "Vehicle Usage Log" form. The user interface engine 214 generates graphical data for displaying the form and provides 812 the form to the user on the portable computing device 102 with resolution higher than Video Graphics Array (VGA) resolution. The form filled with the parsed data can be displayed in its entirety on a display with higher resolution than VGA. The stroke module 212 receives 814 stroke input on the form from the user and stores 816 the form and the strokes input received on the form. For example, the user inputs a handwritten signature on the "Vehicle Usage Log" form to approve his inspection of the vehicle and the stroke module 212 stores the form and stroke annotations received on the form in the data storage 250.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining a location of the portable computing device of a user;
   measuring signal strength of a plurality of pieces of equipment at the location of the portable computing device;
   determining a list of the plurality of pieces of equipment based on signal availability at the location of the portable computing device;
   ordering the list of the plurality of pieces of equipment based on the signal strength;
   determining a piece of equipment in proximity to the portable computing device as the piece of equipment having a highest signal strength;
   providing, for display, a name of the piece of equipment on the portable computing device;
   receiving, from the user, a selection of the piece of equipment;
   determining a type of the piece of equipment;
   extracting logged data from a data logger in the piece of equipment;
   selecting a form specific to activity at the location, from a plurality of forms specific to activity at corresponding locations, based on the location of the portable computing device and the type of the piece of equipment, the form having a structure to fill in with the logged data, wherein selecting the form comprises selecting the form based on the proximity of the portable computing device to the piece of equipment;
   parsing the logged data and filling in a first field in the form; and
   providing, for display, the form on the portable computing device of the user.

2. The method of claim 1, further comprising:
   performing a calculation based on the logged data to generate calculated data; and
   filling in a second field in the form with the calculated data.

3. The method of claim 1, further comprising receiving, from the user, user annotations including handwriting strokes on a third field of the form.

4. The method of claim 1, wherein extracting logged data from the piece of equipment comprises extracting the logged data through a wireless connection with the piece of equipment.

5. The method of claim 1, wherein parsing the logged data and filling in the first field in the form comprises:
   parsing the logged data into a first item of data;
   identifying a label of the first field in the form;
   determining whether the label is matching with the first item of data; and
   responsive to determining that the label is matching with the first item of data, filling the first item of data in the first field.

6. A system comprising:
   one or more processors;
   an extraction module stored on a memory and executable by the one or more processors, the extraction module configured to:
   determine a piece of equipment in proximity to a portable computing device of a user by:
   measuring signal strength of a plurality of pieces of the equipment at the location of the portable computing device, determining a list of the plurality of pieces of equipment based on signal availability at the location of the portable computing device, ordering the list of the plurality of pieces of equipment based on the signal strength, and determining the piece of equipment as having a highest signal strength;

provide, for display, a name of the piece of equipment on the portable computing device, receive, from the user, a selection of the piece of equipment, and extract logged data from a data logger in the piece of equipment;

a form identification module stored on the memory and executable by the one or more processors, the form identification module coupled to the extraction module and configured to determine a location of the portable computing device, determine a type of the piece of equipment and select a form specific to activity at the location, from a plurality of forms specific to activity at corresponding locations, based on the location of the portable computing device and the type of the piece of equipment, the form having a structure to fill in with the logged data, wherein the form identification module selects the form based on the proximity of the portable computing device to the piece of equipment;

a combination module stored on the memory and executable by the one or more processors, the combination module coupled to the form identification module and configured to parse the logged data and fill in a first field in the form; and a user interface engine stored on the memory and executable by the one or more processors, the user interface engine coupled to the combination module and configured to provide the form for display on the portable computing device of the user.

7. The system of claim 6, further comprising:
a calculation module stored on the memory and executable by the one or more processors, the calculation module coupled to the combination module and configured to perform a calculation based on the logged data to generate calculated data and to fill in a second field in the form with the calculated data.

8. The system of claim 6, further comprising a stroke module stored on the memory and executable by the one or more processors to receive, from the user, user annotations including handwriting strokes on a third field of the form.

9. The system of claim 6, wherein the extraction module extracts logged data from the piece of equipment by extracting the logged data through a wireless connection with the piece of equipment.

10. The system of claim 6, wherein the combination module parses the logged data and fills in the first field in the form by parsing the logged data into a first item of data, identifying a label of the first field in the form, determining whether the label is matching with the first item of data, and responsive to determining that the label is matching with the first item of data, filling the first item of data in the first field.

11. A computer program product comprising a non-transitory computer useable medium including a computer readable program, wherein the computer readable program when executed on a computer causes the computer to:
determine a location of the portable computing device of a user;
measure signal strength of a plurality of pieces of equipment at the location of the portable computing device;
determine a list of the plurality of pieces of equipment based on signal availability at the location of the portable computing device;
order the list of the plurality of pieces of equipment based on the signal strength;
determine a piece of equipment in proximity to the portable computing device as the piece of equipment having a highest signal strength;
provide, for display, a name of the piece of equipment on the portable computing device;
receive, from the user, a selection of the piece of equipment;
determine a type of the piece of equipment;
extract logged data from a data logger in the piece of equipment;
select a form specific to activity at the location, from a plurality of forms specific to activity at corresponding locations, based on the location of the portable computing device and the type of the piece of equipment, the form having a structure to fill in with the logged data, wherein to select the form, the computer readable program further causes the computer to select the form based on the proximity of the portable computing device to the piece of equipment;
parse the logged data and fill in a first field in the form; and
provide, for display, the form on the portable computing device of the user.

12. The computer program product of claim 11, wherein the computer readable program, when executed, further causes the computer to:
perform a calculation based on the logged data to generate calculated data; and
fill in a second field in the form with the calculated data.

13. The computer program product of claim 11, wherein the computer readable program, when executed, further causes the computer to receive, from the user, user annotations including handwriting strokes on a third field of the form.

14. The computer program product of claim 11, wherein to extract logged data from the piece of equipment, the computer readable program further causes the computer to extract the logged data through a wireless connection with the piece of equipment.

* * * * *